US012697647B2

(12) United States Patent
    Gabbey

(10) Patent No.: US 12,697,647 B2
(45) Date of Patent: Aug. 4, 2026

(54) CLEANING TOOL FOR A ROOF DRAIN TUBE AND METHOD OF USE

(71) Applicant: Snap-on Incorporated, Kenosha, WI (US)

(72) Inventor: Nicholas A. Gabbey, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 18/801,665

(22) Filed: Aug. 12, 2024

(65) Prior Publication Data

US 2026/0042129 A1     Feb. 12, 2026

(51) Int. Cl.
    | | |
    |---|---|
    | *B08B 9/00* | (2006.01) |
    | *B08B 9/04* | (2006.01) |
    | *B60J 7/00* | (2006.01) |
    | *B60R 13/07* | (2006.01) |
    | *E03C 1/302* | (2006.01) |

(52) U.S. Cl.
    CPC *B08B 9/04* (2013.01); *B08B 9/00* (2013.01); *B08B 2209/04* (2013.01); *B60J 7/0084* (2013.01); *B60R 13/07* (2013.01); *E03C 1/302* (2013.01)

(58) Field of Classification Search
    CPC ............ B08B 9/027–057; B60J 7/0084; B60R 13/07; E03C 1/302
    See application file for complete search history.

(56) References Cited

U.S. PATENT DOCUMENTS

| | | | |
|---|---|---|---|
| 1,653,002 | A | 12/1927 | Coleman |
| 1,782,871 | A | 11/1930 | Fischer |
| 1,844,433 | A | 2/1932 | Markowitz |
| 1,851,766 | A | 3/1932 | Hotchkiss, Jr. |
| 3,283,353 | A | 11/1966 | Kirk |
| 4,364,140 | A | 12/1982 | Irwin |
| 4,771,500 | A | 9/1988 | Kovacs |
| 4,914,776 | A | 4/1990 | Kaye |
| 5,765,251 | A | 6/1998 | Jones |

(Continued)

FOREIGN PATENT DOCUMENTS

| | | | |
|---|---|---|---|
| DE | 202021104476 | * | 8/2021 |
| JP | 6359493 B2 | | 7/2016 |

OTHER PUBLICATIONS

"Brand New Flexible Car Drain DredgeSunroof Cleaning Scrub Brush Tool 150CM," Walmart.com, Mar. 11, 2024, 3 pages.

(Continued)

*Primary Examiner* — Kaj K Olsen
*Assistant Examiner* — Richard Z. Zhang
(74) *Attorney, Agent, or Firm* — McDonnell Boehnen & Berghoff LLP

(57) ABSTRACT

A cleaning tool for a vehicle roof drain tube includes a flexible line, a handle having first and second ends and an interior channel therebetween, a tube extending from the first end of the handle and terminating at a work end, and a flexible tip on the work end of tube that is configured to abut an entry port of the vehicle drain tube. The flexible line extends from the second end of the handle, though the interior channel and first end of the handle, through the tube, and through the flexible tip. The cleaning tool also includes a clamp on the handle for selectively engaging the flexible line.

19 Claims, 5 Drawing Sheets

(56)　　References Cited

U.S. PATENT DOCUMENTS

| | | |
|---|---|---|
| 7,810,176 B2 | 10/2010 | Turner |
| 8,359,696 B1 | 1/2013 | Turner et al. |
| 9,670,656 B2 | 6/2017 | Rutkowski et al. |
| 9,683,356 B1 | 6/2017 | Selius |
| 10,047,508 B2 | 8/2018 | Elliott et al. |
| 10,202,744 B2 | 2/2019 | Patterson et al. |
| 10,400,433 B2 | 9/2019 | Mills |
| 10,570,596 B1 | 2/2020 | Schneck et al. |
| 10,683,648 B2 | 6/2020 | Beck et al. |
| D899,017 S | 10/2020 | Najimi |
| 10,808,388 B2 | 10/2020 | Patterson et al. |
| 10,857,577 B2 | 12/2020 | Turner et al. |
| 11,458,425 B2 | 10/2022 | Gaines |
| 2005/0251938 A1 | 11/2005 | Hofer, Sr. et al. |
| 2007/0089254 A1 | 4/2007 | Alaine |
| 2013/0000680 A1 | 1/2013 | Azelton et al. |
| 2013/0019422 A1 | 1/2013 | Miller et al. |
| 2013/0247348 A1 | 9/2013 | Kitagawa et al. |
| 2016/0067752 A1 | 3/2016 | Dennis et al. |
| 2018/0230689 A1 | 8/2018 | Schaafsma |
| 2019/0292759 A1 | 9/2019 | Parker et al. |
| 2020/0318331 A1 | 10/2020 | Patterson et al. |
| 2021/0094516 A1 | 4/2021 | Zolghadr |
| 2022/0088649 A1 | 3/2022 | Kehoe et al. |

OTHER PUBLICATIONS

"Drain Auger,10FT Snake Drain Clog Remover Tool for Sewers, Kitchens and Bathrooms, Comes with Gloves and Drain Snake Flex Pickup and Hair Clog Plastic Strip (10FT)," PDHTC, Amazon.com, Mar. 11, 2024, 7 pages.

"Long Wire Brush sunroof Drain Cleaning Tool for car and Fridge 60-inch X ⅖ inch," Amazon.com, https://www.amazon.com/Brush-sunroof-Cleaning-Fridge-60-inch/dp/B09SWSVZ8Z on Mar. 11, 2024, 2024, 8 pages.

"Upgraded Auto Sunroof Drain Cleaning Tool, 78 Inch Flexible Drain Brush Long Pipe Cleaners for Car, Tube Cleaning Brush Slim Drain Dredging Tool Perfect for Car Sunroof, Windshield Wiper Drain Hole," Amazon.com, Mar. 11, 2024, 8 pages.

"WDT-250 Water Drain Cleaning Tool WDT-250 Water Drain Cleaning Tool WDT-250 Water Drain Cleaning Tool WDT-250 Water Drain Cleaning Tool WDT-250 Water Drain Cleaning Tool," Weilander and Schill, https://www.wielanderschill.com/ en/products/ car-body-repair/painting-equipment-and-storage-solutions/16395/ wdt-250-water-drain-cleaning-tool Mar. 11, 2024, 2 pages.

International Searching Authority, International Search Report and Written Opinion mailed on Oct. 9, 2025, issued in connection with International Patent Application No. PCT/US2025041517, filed Aug. 11, 2025, 11 pages.

* cited by examiner

CLEANING TOOL FOR A ROOF DRAIN TUBE AND METHOD OF USE

BACKGROUND

Vehicle roof drain tubes are typically located behind headliners, pillar trim, and dashboards. The drain tubes may be difficult to access upon becoming plugged by foreign material, such as plant matter or debris that has travelled past the roof glass seal to vehicle body as a result of water pressure or an air gap in the glass seal. Once this occurs, the foreign material may enter a water tray of the roof and wash down the drain tubes, where the material may stick to the drain tube or transitions and block the flow of water. After the flow of water is blocked, water may back up and fill the water tray until the water enters a cabin of the vehicle.

SUMMARY

This disclosure relates to cleaning tool for a vehicle roof drain tube and a method of using the tool. Embodiments of the tool and method may improve removal of foreign material from a vehicle roof drain tube while reducing the risk of damage to the drain tube and the risk of the drain tube disconnecting from other components of the vehicle.

In one embodiment, a cleaning tool for a vehicle roof drain tube includes a flexible line, a handle having first and second ends and an interior channel therebetween, a tube extending from the first end of the handle and terminating at a work end, and a flexible tip on the work end of tube that is configured to abut an entry port of the vehicle drain tube. The flexible line extends from the second end of the handle, though the interior channel and first end of the handle, through the tube, and through the flexible tip. The cleaning tool also includes a clamp on the handle for selectively engaging the flexible line.

In another embodiment, a method includes positioning, at an entry port of a vehicle roof drain tube, a cleaning tool. The cleaning tool includes a flexible line, a handle having first and second ends and an interior channel therebetween, a tube extending from the first end of the handle and terminating at a work end, and a flexible tip on the work end of tube that is configured to abut the entry port. The flexible line extends from the second end of the handle, though the interior channel and first end of the handle, through the tube, and through the flexible tip. The cleaning tool also includes a clamp on the handle for selectively engaging the flexible line. The method further includes threading the flexible line through the interior channel, the tube, and the flexible tip such that the flexible line is inserted into the vehicle roof drain tube.

Other embodiments will become apparent to those of ordinary skill in the art by reading the following detailed description, with reference to the accompanying drawings.

BRIEF DESCRIPTION OF THE DRAWINGS

Example embodiments are described herein with reference to the drawings.

DETAILED DESCRIPTION

This description describes several example embodiments, at least some of which pertain to cleaning tools for cleaning a vehicle roof drain tube and methods of use. In some embodiments, the vehicle roof is a sunroof. In some embodiments, the vehicle roof is a moonroof. In some embodiments, the vehicle is an automotive vehicle.

Figure 1A:
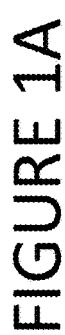
FIG. 1A is a perspective view of a cleaning tool for a vehicle roof drain tube in accordance with an example embodiment.
Figure 1B:
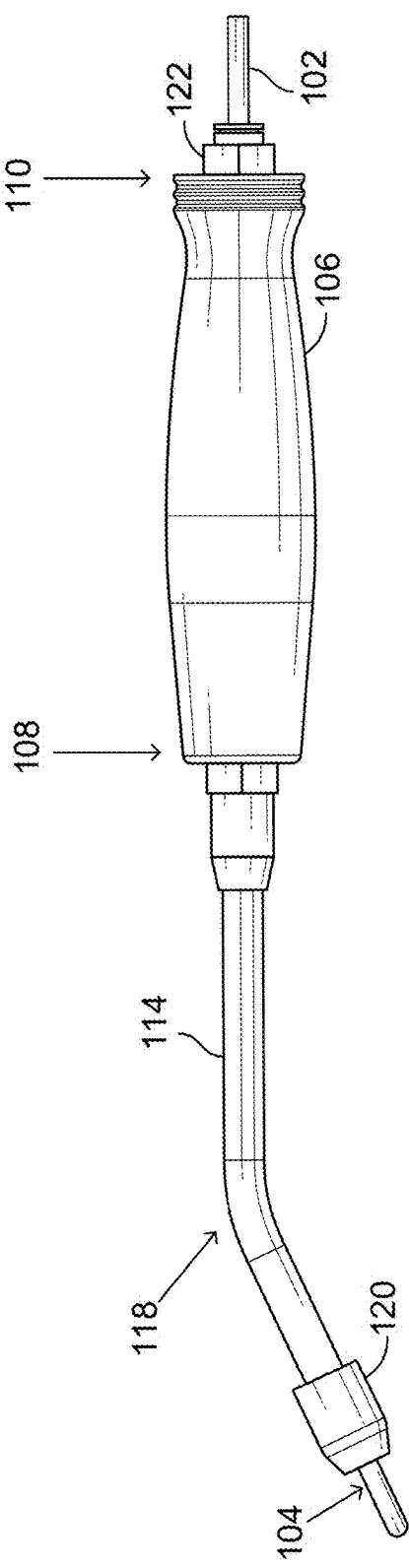
FIG. 1B is a side view of the cleaning tool of FIG. 1A in accordance with an example embodiment.
Figure 1B:
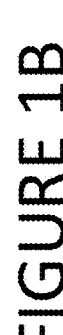
Figure 1C:
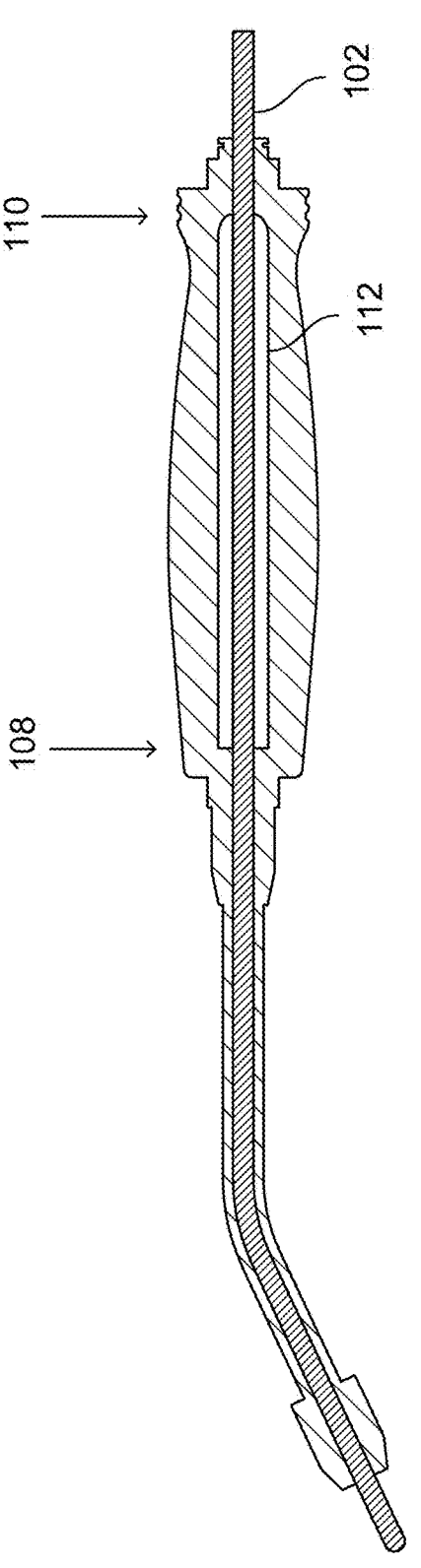
FIG. 1C is a section view of the cleaning tool for the vehicle roof drain tube of FIG. 1A in accordance with an example embodiment.
Figure 1C:
Figure 1D:
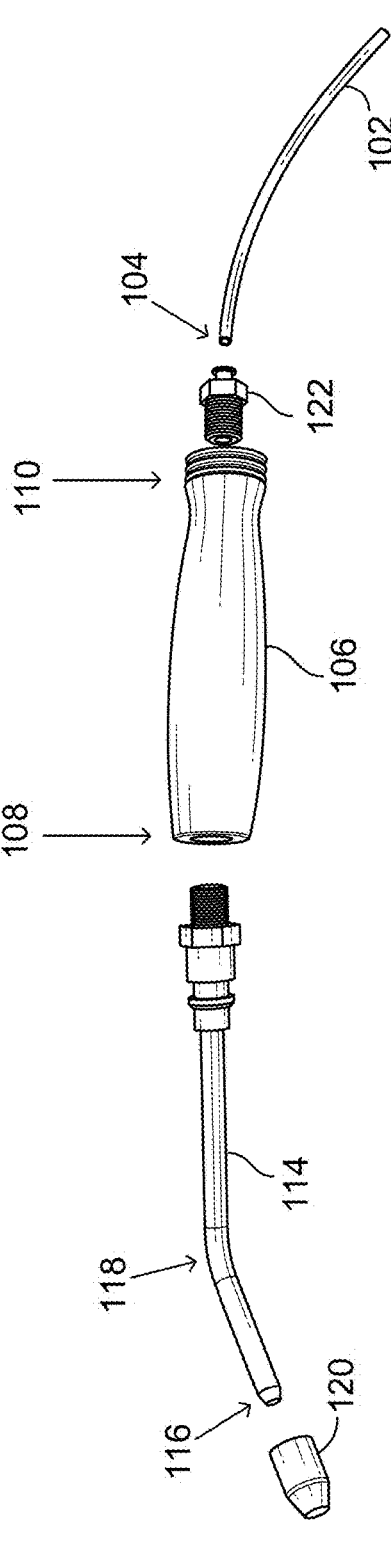
FIG. 1D is an exploded view of the cleaning tool for the vehicle roof drain tube of FIG. 1A in accordance with an example embodiment.
Figure 1D:
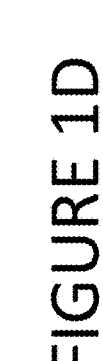

FIGS. 1A-1D show multiple views of a cleaning tool 100 for a vehicle roof drain tube with an entry port in accordance with an example embodiment. The cleaning tool 100 includes a flexible line 102 and a handle 106 having a first end 108 and a second end 110, and an interior channel 112 therebetween (as best shown in FIG. 1C). A tube 114 extends from the first end 108 of the handle 106 and terminates at a work end 116 of the tube 114 (as best shown in FIG. 1D). A flexible tip 120 is positioned on the work end 116 of tube 114, and the flexible tip 120 is configured to abut the entry port of the vehicle roof drain tube. The flexible line 102 extends from the second end 110 of the handle 106, though the interior channel 112 and first end 108 of the handle 106, through the tube 114, and through the flexible tip 120. The cleaning tool 100 also includes a clamp 122 on the handle 106 for selectively engaging the flexible line 102.

In some embodiments, a user may place the flexible tip 120 of the cleaning tool 100 against a water tray of a vehicle roof and an entry port of a vehicle roof drain tube of the vehicle, which may reduce flex in the flexible line 102. Such a reduction of flex in the flexible line 102 may enable the user to feed the flexible line 102 though the handle 106 from a remote location, which may be clear of obstacles on the vehicle. Once the user feels an obstruction in the vehicle roof drain tube, the user may push the obstruction through the vehicle roof drain tube by feeding the flexible line 102 through the handle 106.

Further, in some embodiments, a user may increase push through force of the flexible line 102 by using the clamp 122 on the handle 106 to restrict bi-directional movement of the flexible line 102 through the cleaning tool 100, which may improve the cleaning tool 100 clearing the obstruction from the vehicle roof drain tube.

The material for the flexible line 102 may be selected to be (a) flexible enough such that the flexible line 102 may be inserted into the vehicle roof drain tube, and (b) rigid enough to be able to clear the obstruction from the vehicle roof drain tube. The diameter of the flexible line 102 may be selected such that the flexible line diameter is smaller than a diameter of the vehicle roof drain tube into which it is inserted. Although different embodiments of the cleaning tool 100 utilize a flexible line 102 with a wide variety of different line diameters (both less than 0.10 inch and greater than 0.20 inch), it has been found that a line diameter between 0.10 inch and 0.20 inch provides a satisfactory structure, which is both small enough to fit into many roof drain tubes while exhibiting the preferred characteristics of adequate flexibility and rigidity. The embodiment of FIG. 1 has a diameter of 0.15 inch, the middle of the preferred range. Further, in some embodiments, the flexible line 102 is made of a non-kinking plastic material. Although many different materials may be used, the materials, polyvinyl chloride, thermoplastic elastomer, nylon, and silicone, have been found to exhibit the preferred, non-kinking characteristic.

Further, in some embodiments, an obstruction-engaging end 104, of the flexible line 102 may be inserted through the vehicle roof drain tube to clear the obstruction from the vehicle roof drain tube. The obstruction-engaging end 104 may be referred to as a forward end.

The handle 106 has a length and a shape to enable a user to grip the handle 106. In such embodiments, which have be determined to be most conducive for such gripping, the handle 106 may have a length between 4 inch and 6 inch. The embodiment shown in FIG. 1, with a length of 4.75 inch, is suitable for most users. The circumference of the handle 106 may be selected to increase both the user's dexterity in using the cleaning tool 100 and the force that the user can apply to the flexible line 102 when the cleaning tool 100 is used to clean a vehicle roof drain tube. Further, in some embodiments, the interior channel 112 of the handle 106 is centered around an axis running through a center point on the first end 108 of the handle 106 and a center point on the second end 110 of the handle 106.

In the embodiment shown in FIG. 1, the tube 114 is hollow. Again, different embodiments of the cleaning tool 100 utilize a tube 114 with a wide variety of diameters that correspond to the size of the flexible tube 102. In light of size of the flexible tube 102 shown in FIG. 1, the corresponding tube 114 in FIG. 1 has an inner diameter between 0.12 inch and 0.25 inch (e.g., an inner diameter of 0.18 inch) and an outer diameter between 0.25 inch and 0.45 inch (e.g., an outer diameter of 0.30 inch). Further, while the tube 114 may have a wide variety of lengths, the tube 114 shown in FIG. 1, so as to be consistent with the length of the handle 106, has a length between 4.5 inch and 8 inch, such as a length of 6 inch.

Further, in one embodiment, the tube 114 extends from the first end 108 of the handle 106 in a straight line across its entire length. This embodiment requires no bending operation in its manufacture. In other embodiments, the tube 114 extends from the first end 108 of the handle 106 and includes a bend 118. This embodiment is more complex to make, but is more convenient for some users to operate. In such embodiments, the bend 118 is between 0 degrees and 90 degrees from a centerline of the handle 106. Embodiments in which the bend 118 is between 15 degrees and 25 degrees from a centerline of the handle 106 allow for convenient operation for many users.

The bend 118 may be located anywhere along a length of the tube 114. The bend 118 of the tube 114 may be selected, both in terms of position and degree of bend, such that use of the cleaning tool 100 is convenient for a user when used to clean a vehicle roof drain tube. In doing so, the work end 116 of the tube 114 may guide the flexible line 102 through the flexible tip 120 and into the vehicle roof drain tube. Embodiments are convenient for many users where the bend 118 lies between (a) halfway from the first end 108 of the handle 106 to the work end 116 of the tube 114 and (b) two-thirds of the way from the first end 108 of the handle 106 to the work end 116 of the tube 114.

In some embodiments, the tube 114 and the handle 106 may be molded together as a unit. In such embodiments, the handle 106 and the tube 114 may be made from the same material and thus require fewer steps in manufacture. Alternatively, in other embodiments, the tube 114 is be threaded onto the handle 106 at its first end 108. Such embodiments require a less complex mold for the handle 106 and readily available tube stock for the tube 114.

Further, in some embodiments, the tube 114 is rigid, and a material of the tube 114 is selected to be rigid when in use, and comprised of a metal, such as steel or aluminum. In such embodiments, the tube 114 may be collapsible for storage of the cleaning tool 100. For instance, in such embodiments, the tube 114 may be fully removable from the handle 106 or the tube 114 may be bent at a joint in relation to the handle 106 or both.

In other embodiments, the tube 114 may be semi-flexible when in use, such that the tube 114 is bendable upon application of a force, so as to enable a user to curve the tube 114 around obstacles. In such embodiments, the tube 114 is comprised of an elastomeric material, such as rubber, nylon, and silicone. In other embodiments, the tube 114 is metal tubing.

In some embodiments, the flexible tip 120 is press fit onto the work end 116 of tube 114, and the flexible tip 120 is configured to abut the entry port of the vehicle roof drain tube. In such embodiments, the flexible tip 120 includes a through hole through which the flexible line 102 may pass from the tube 114 to the vehicle roof drain tube. In some embodiments, the flexible tip 120 has a substantially cone-shaped exterior or a substantially rounded-end-shaped exterior. The size and shape of the flexible tip 120 may be selected such that, upon removal of the flexible line 102 from the vehicle roof drain tube and through the cleaning tool 100, contaminants on the flexible line 102 may be removed via the flexible tip 120. A cone or rounded-end shape of the flexible tip 120 may improve removal of contaminants on the flexible line 102. While embodiments of the flexible tip 120 may have a wide variety of shapes and sizes, a flexible tip 120 that is either substantially cone-shaped exterior or a substantially rounded-end-shaped and has an outer diameter between 0.35 inch and 0.65 inch and an inner diameter between 0.12 inch and 0.24 inch has been determined particularly useful. The embodiment shown in FIG. 1, wherein the tip has an outer diameter of 0.15 inch and an outer diameter of 0.15 inch, has broad application to many automotive vehicles.

In some embodiments, the clamp 122 is a coupling collet clamp that is threaded onto the second end 110 of the handle 106 for selectively engaging the flexible line 102. Further, in some embodiments, the clamp 122 reduces, restricts, or prevents bi-directional movement of the flexible line 102 through the cleaning tool 100 when a sleeve of the clamp 122 is not depressed. When the sleeve is not depressed, therefore, the clamp 122 may allow the handle 106 to be used to increase the push through force of the flexible line 102 to help clear the obstruction by preventing the flexible line 102 to slip backwards from the vehicle roof drain tube.

Figure 2:
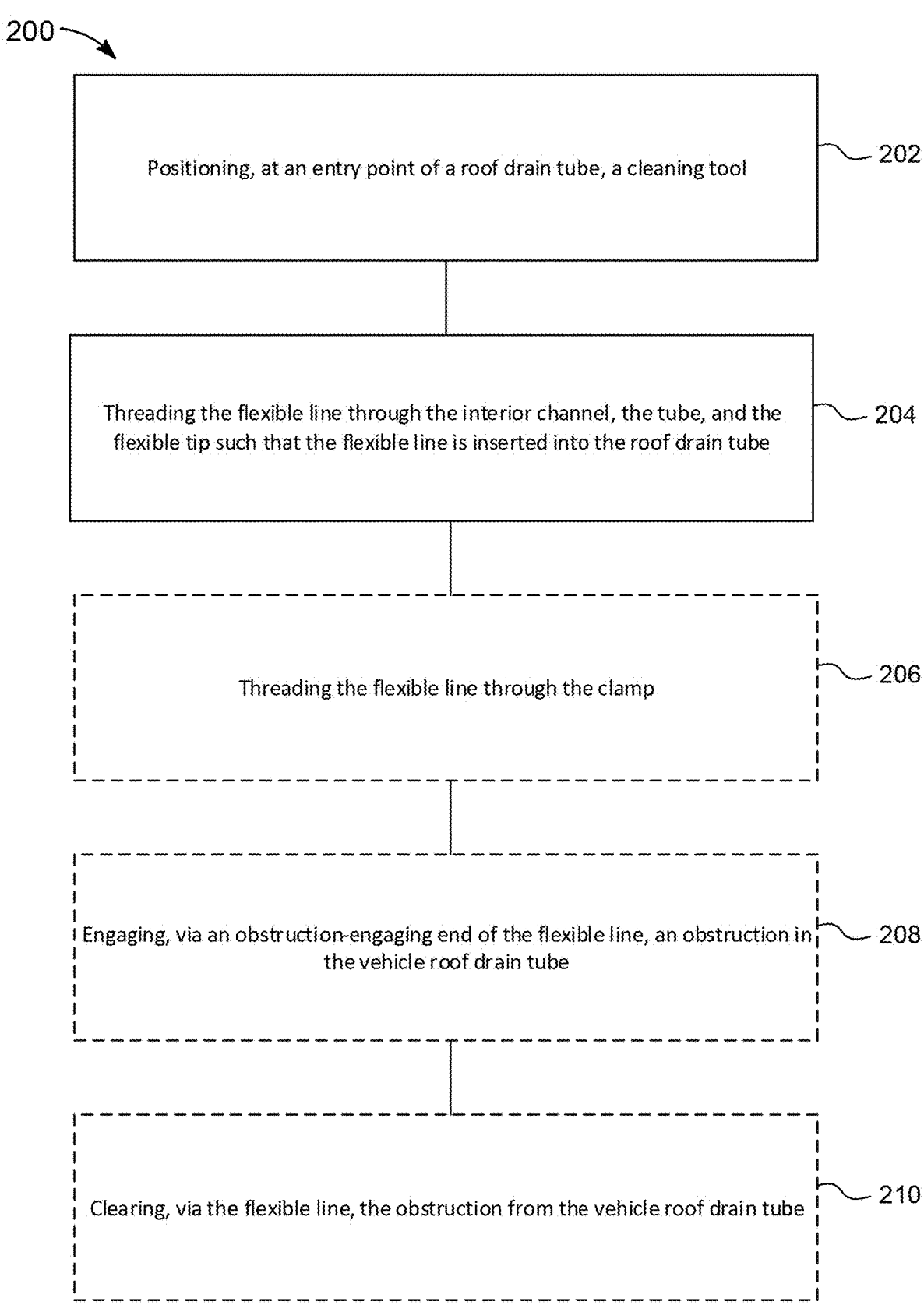
FIG. 2 is a flow chart of a method in accordance with an example embodiment.

FIG. 2 is a flow chart of a method 200 for using the cleaning tool 100 in a vehicle roof drain tube. The method 200 includes one or more operations, functions, or actions as illustrated by blocks 202 and 210. Any additional blocks may be performed in parallel, and/or in a different order than those described herein. Also, the various blocks may be combined into fewer blocks, divided into additional blocks, and/or removed based upon the desired implementation.

At block 202, the method 200 includes positioning, at an entry port of a vehicle roof drain tube, a cleaning tool. The cleaning tool includes a flexible line, a handle having first and second ends and an interior channel therebetween, a tube extending from the first end of the handle and terminating at a work end, and a flexible tip on the work end of tube that is configured to abut the entry port. The flexible line extends from the second end of the handle, though the interior channel and first end of the handle, through the tube, and through the flexible tip. The cleaning tool also includes a clamp on the handle for selectively engaging the flexible line. The cleaning tool may include any feature of the cleaning tool 100 described above with respect to FIGS. 1A-1D.

At block 204, the method 200 includes threading the flexible line through the interior channel, the tube, and the flexible tip of the cleaning tool such that the flexible line is inserted into the vehicle roof drain tube.

In some embodiments, the method 200 may include additional operations, functions, or actions. For example, at block 206, the method 200 further includes threading the flexible line through the interior channel, the tube, and the flexible tip of the cleaning tool includes threading the flexible line through the clamp such that the clamp is a coupling collet clamp threaded into the second side of the handle and such that the coupling collet clamp restricts bi-directional movement of the flexible line through the cleaning tool when a sleeve is not depressed.

At block 208, the method further includes engaging, via an obstruction-engaging end of the flexible line, an obstruction in the vehicle roof drain tube.

At block 210, the method further includes clearing, via flexible line, the obstruction from the vehicle roof drain tube.

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) may be used instead, and some elements may be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

Implementations of the present disclosure can thus relate to one of the enumerated examples (EE) listed below.

EE 1 is a cleaning tool for a vehicle roof drain tube comprising a flexible line, a handle having first and second ends and an interior channel therebetween, a tube extending from the first end of the handle and terminating at a work end, and a flexible tip on the work end of tube that is configured to abut an entry port of the vehicle drain tube. The flexible line extends from the second end of the handle, though the interior channel and first end of the handle, through the tube, and through the flexible tip. The cleaning tool also includes a clamp on the handle for selectively engaging the flexible line.

EE 2 is the cleaning tool of EE 1, the flexible line having a diameter between 0.10 inch and 0.20 inch.

EE 3 is the cleaning tool of EE 1 or EE 2, the flexible line comprising a non-kinking plastic material.

EE 4 is a cleaning tool of any of EE 1 to EE 3, the interior channel being centered around an axis running through a center point on the first end of the handle and a center point on the second end of the handle.

EE 5 is a cleaning tool of any of EE 1 to EE 4, the tube further comprising a bend.

EE 6 is a cleaning tool of EE 5, the bend is between 15 degrees and 35 degrees.

EE 7 is a cleaning tool of any of EE 1 to EE 4, the tube being straight.

EE 8 is a cleaning tool of any of EE 1 to EE 7, the handle and the tube being molded as a unit.

EE 9 is a cleaning tool of any of EE 1 to EE 7, the tube being threaded into the handle.

EE 10 is a cleaning tool of any of EE 1 to EE 9, the tube being rigid.

EE 11 is a cleaning tool of EE 9, the tube being collapsible.

EE 12 is a cleaning tool of any of EE 1 to EE 9, the tube being semi-flexible such that the tube is moldable upon application of a force.

EE 13 is a cleaning tool of any of EE 1 to EE 12, the flexible tip comprising at least one of a cone shape and a rounded-end shape.

EE 14 is a cleaning tool of any of EE 1 to EE 13, the flexible tip being press fit onto the work end of the tube.

EE 15 is a cleaning tool of any of EE 1 to EE 14, the flexible tip having an outer diameter between 0.35 inch and 0.65 inch and an inner diameter between 0.12 inch and 0.24 inch.

EE 16 is a cleaning tool of any of EE 1 to EE 15, the clamp being a coupling collet clamp threaded into the second end of the handle.

EE 17 is a cleaning tool of EE 15, the coupling collet clamp restricting bi-directional movement of the flexible line through the cleaning tool when a sleeve is not depressed.

EE 18 is a method of using a cleaning tool for a vehicle roof drain tube comprising positioning, at an entry port of a vehicle roof drain tube, a cleaning tool. The cleaning tool includes a flexible line, a handle having first and second ends and an interior channel therebetween, a tube extending from the first end of the handle and terminating at a work end, and a flexible tip on the work end of tube that is configured to abut the entry port. The flexible line extends from the second end of the handle, though the interior channel and first end of the handle, through the tube, and through the flexible tip. The cleaning tool also includes a clamp on the handle for selectively engaging the flexible line. The method further includes threading the flexible line through the interior channel, the tube, and the flexible tip such that the flexible line is inserted into the vehicle roof drain tube.

EE 19 is a method of EE 18, further comprising threading the flexible line through the interior channel, the tube, and the flexible tip further includes threading the flexible line through the clamp such that the clamp is a coupling collet clamp threaded into the second side of the handle and such that the coupling collet clamp restricts bi-directional movement of the flexible line through the cleaning tool when a sleeve is not depressed.

EE 20 is the method of EE 18 or EE 10, the method further comprising engaging, via an obstruction-engaging end of the flexible line, an obstruction in the vehicle roof drain tube and clearing, via the flexible line, the obstruction from the vehicle roof drain tube.

What is claimed is:

1. A method comprising:

positioning, at an entry port of a vehicle roof drain tube, a cleaning tool, wherein the cleaning tool comprises:

a flexible line, a handle having a first end and a second end and an interior channel therebetween, a tube extending from the first end of the handle and terminating at a work end, a flexible tip on the work end of the tube, configured to abut the entry port, the flexible line extending from the second end of the handle, though the interior channel and the first end of the handle, through the tube, and through the flexible tip, and a clamp on the handle for selectively engaging the flexible line; and threading the flexible line through the interior channel, the tube, and the flexible tip such that the flexible line is inserted into the vehicle roof drain tube.

2. The method of claim 1, wherein the flexible line has a diameter between 0.10 inch and 0.20 inch.

3. The method of claim 1, wherein the flexible line comprises a non-kinking plastic material.

4. The method of claim 1, wherein the interior channel is centered around an axis running through a center point on the first end of the handle and a center point on the second end of the handle.

5. The method of claim 1, wherein the tube further comprises a bend.

6. The method of claim 5, wherein the bend is between 15 degrees and 35 degrees.

7. The method of claim 1, wherein the tube is straight.

8. The method of claim 1, wherein the handle and the tube are moulded as a unit.

9. The method of claim 1, wherein the tube is threaded into the handle.

10. The method of claim 1, wherein the tube is rigid.

11. The method of claim 1, wherein the tube is collapsible.

12. The method of claim 1, wherein the tube is semi-flexible such that the tube is moldable upon application of a force.

13. The method of claim 1, wherein the flexible tip comprises at least one of a cone shape and a rounded-end shape.

14. The method of claim 1, wherein the flexible tip is press fit onto the work end of the tube.

15. The method of claim 1, wherein the flexible tip has an outer diameter between 0.35 inch and 0.65 inch and an inner diameter between 0.12 inch and 0.24 inch.

16. The method of claim 1, wherein the clamp is a coupling collet clamp threaded into the second end of the handle.

17. The method of claim 16, wherein the coupling collet clamp restricts bi-directional movement of the flexible line through the cleaning tool when a sleeve is not depressed.

18. The method of claim 1, wherein threading the flexible line through the interior channel, the tube, and the flexible tip further comprises:

threading the flexible line through the clamp, wherein the clamp is a coupling collet clamp threaded into the second end of the handle, and wherein the coupling collet clamp restricts bi-directional movement of the flexible line through the cleaning tool when a sleeve is not depressed.

19. The method of claim 1, further comprising:

engaging, via an obstruction-engaging end of the flexible line, an obstruction in the vehicle roof drain tube; and clearing, via the flexible line, the obstruction from the vehicle roof drain tube.

* * * * *